United States Patent
Kisaichi et al.

(10) Patent No.: US 10,890,246 B2
(45) Date of Patent: Jan. 12, 2021

(54) TRANSMISSION

(71) Applicant: HONDA MOTOR CO., LTD., Tokyo (JP)

(72) Inventors: Toru Kisaichi, Wako (JP); Hiroyuki Kaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 570 days.

(21) Appl. No.: 15/715,456

(22) Filed: Sep. 26, 2017

(65) Prior Publication Data

US 2018/0094718 A1 Apr. 5, 2018

(30) Foreign Application Priority Data

Sep. 30, 2016 (JP) ................................. 2016-194619

(51) Int. Cl.
| | | |
|---|---|---|
| *F16H 57/04* | (2010.01) | |
| *F16H 57/02* | (2012.01) | |
| *F16H 3/091* | (2006.01) | |

(52) U.S. Cl.
CPC ......... *F16H 57/0423* (2013.01); *F16H 3/091* (2013.01); *F16H 57/02* (2013.01); *F16H 57/0456* (2013.01); *F16H 57/0457* (2013.01); *F16H 57/0494* (2013.01); *F16H 57/043* (2013.01); *F16H 57/0424* (2013.01); *F16H 57/0431* (2013.01); *F16H 57/0436* (2013.01); *F16H 57/0441* (2013.01); *F16H 2057/02065* (2013.01)

(58) Field of Classification Search
CPC .. F16H 57/0423; F16H 3/091; F16H 57/0456; F16H 57/0424; F16H 57/043; F16H 57/0436

USPC .......................................................... 74/325
See application file for complete search history.

(56) References Cited

U.S. PATENT DOCUMENTS

| | | | | |
|---|---|---|---|---|
| 3,738,452 A | * | 6/1973 | Hausinger | F16H 57/0421 184/6.12 |
| 5,158,152 A | * | 10/1992 | Nemoto | F16H 57/0447 184/6.12 |
| 10,539,224 B2 | * | 1/2020 | Hori | F16H 57/0484 |

(Continued)

FOREIGN PATENT DOCUMENTS

| | | |
|---|---|---|
| JP | H04-249659 A | 9/1992 |
| JP | 2005-180488 A | 7/2005 |
| JP | 2013-210015 A | 10/2013 |

OTHER PUBLICATIONS

Official communication dated Jun. 6, 2018 issued in the corresponding Japanese patent application 2016-194619.

(Continued)

*Primary Examiner* — Ha Dinh Ho

(74) *Attorney, Agent, or Firm* — Carrier Blackman & Associates, P.C.; William D. Blackman; Joseph P. Carrier

(57) ABSTRACT

A transmission includes an oil pipe disposed above a first gear group and a second gear group, the oil pipe having small holes. The oil pipe is formed integrally with a first restricting portion and a second restricting portion, the first restricting portion abutting against an inner surface of a first unit inside a case to thereby restrict an axial position of the oil pipe on an outside in one direction, and the second restricting portion abutting against an inner surface of a second unit to thereby restrict an axial position of the oil pipe on an outside in an other direction and rotation thereof.

10 Claims, 6 Drawing Sheets

(56) References Cited

U.S. PATENT DOCUMENTS

2007/0295159 A1* 12/2007 Nishi .................. F16H 57/04
                                              74/606 R
2012/0260769 A1   10/2012 Rollins et al.
2014/0054114 A1*  2/2014 Isomura ............. F16H 57/0427
                                              184/6.12

OTHER PUBLICATIONS

Extended European search report issued in the corresponding EP patent application 17193987.9.

* cited by examiner

TRANSMISSION

BACKGROUND OF THE INVENTION

Field of the Invention

The present invention relates to a transmission that includes a first gear group disposed on a first shaft that is supported straddlingly on a pair of cases, a second gear group disposed on a second shaft and meshing with the first gear group, and an oil pipe disposed above the first gear group and the second gear group, the oil pipe having a small hole.

Description of the Related Art

Japanese Patent Application Laid-open No. 2013-210015 discloses a transmission. The transmission includes an oil pipe that extends so as to straddle left and right cases. A lubrication oil passage is formed inside the oil pipe. Oil is dripped onto a meshing portion of gears from holes in the oil pipe.

In order for the oil to be dripped onto the gear meshing portion from the holes formed in the oil pipe, positions of the oil pipe need to be restricted in an axial direction and a rotating direction. To achieve that end, a bolt hole and a pin housing hole are formed in the transmission case, which results in an increased size of the transmission case.

SUMMARY OF THE INVENTION

The present invention has been achieved in view of the above-mentioned circumstances and it is an object thereof to provide a transmission capable of favorably supplying oil to a meshing portion, while avoiding an increase in size of a case.

In order to achieve the object, according to a first feature of the present invention, there is provided a transmission comprising: a case formed by coupling at least a first unit and a second unit together; a first gear group disposed on a first shaft that is supported straddlingly on the first unit and the second unit; a second gear group disposed on a second shaft and meshing with the first gear group; and an oil pipe disposed above the first gear group and the second gear group, the oil pipe having small holes, wherein the oil pipe is formed integrally with a first restricting portion and a second restricting portion, the first restricting portion abutting against an inner surface of the first unit inside the case to thereby restrict an axial position of the oil pipe on an outside in one direction, and the second restricting portion abutting against an inner surface of the second unit to thereby restrict an axial position of the oil pipe on an outside in an other direction and rotation thereof.

With the first feature, when the first unit of the case and the second unit of the case are coupled together at a faying surface, the first restricting portion and the second restricting portion abut against respective inner surfaces of the first unit and the second unit. The small holes in the oil pipe are thereby accurately positioned with respect to gear meshing portions, so that oil can be dripped precisely onto the gear meshing portions. Because bolt holes and pin housing holes are omitted in positioning the oil pipe at this time, an increase in size of the case can be prevented. Moreover, assemblability of the case is enhanced.

According to a second feature of the present invention, in addition to the first feature, the second restricting portion includes an arm portion extending outwardly from an outer periphery of the oil pipe, and the arm portion abuts against an outer peripheral wall of the second unit at two places.

With the second feature, rotational restriction can be provided with a simple configuration without the need to provide a boss, for example, on the case side.

According to a third feature of the present invention, in addition to the second feature, the arm portion abuts against an axial support surface of the second unit to thereby restrict the axial position of the oil pipe.

With the third feature, axial positioning can be performed reliably by the first restricting portion and the arm portion of the second restricting portion, so that lubrication of the meshing portions can be favorably achieved.

According to a fourth feature of the present invention, in addition to any of the first to third features, the first restricting portion has a shape different from a shape of the second restricting portion.

With the fourth feature, an assembly operator can readily differentiate between the first restricting portion and the second restricting portion. When, for example, the oil pipe is wrongly assembled in the case, the shapes reject abutment against the inner surfaces of the case, so that wrong assembly can be prevented.

According to a fifth feature of the present invention, in addition to any of the first to fourth features, the first unit includes a first oil passage formed therein, the first oil passage communicating with a scavenge pump and having an opening disposed in the inner surface of the first unit so as to receive and support one end of the oil pipe, and the second unit includes a second oil passage formed therein, the second oil passage communicating with a hollow space in the second shaft and having an opening disposed in the inner surface of the second unit so as to receive and support an opposite end of the oil pipe.

With the fifth feature, since having protrusions for restriction are provided only on the outer periphery of the oil pipe, but not on the inside thereof, it is possible to achieve favorable oil flow.

The above and other objects, characteristics, and advantages of the present invention will be clear from detailed descriptions of the preferred embodiment which will be provided below while referring to the attached drawings.

DESCRIPTION OF THE PREFERRED EMBODIMENT

An embodiment of the present invention will be described below with reference to the accompanying drawings. It should here be noted that expressions indicating directions including up and down, front and rear, and right and left, are to be defined on the basis of a line of sight of an occupant riding on a two-wheeled motor vehicle.

Figure 1:
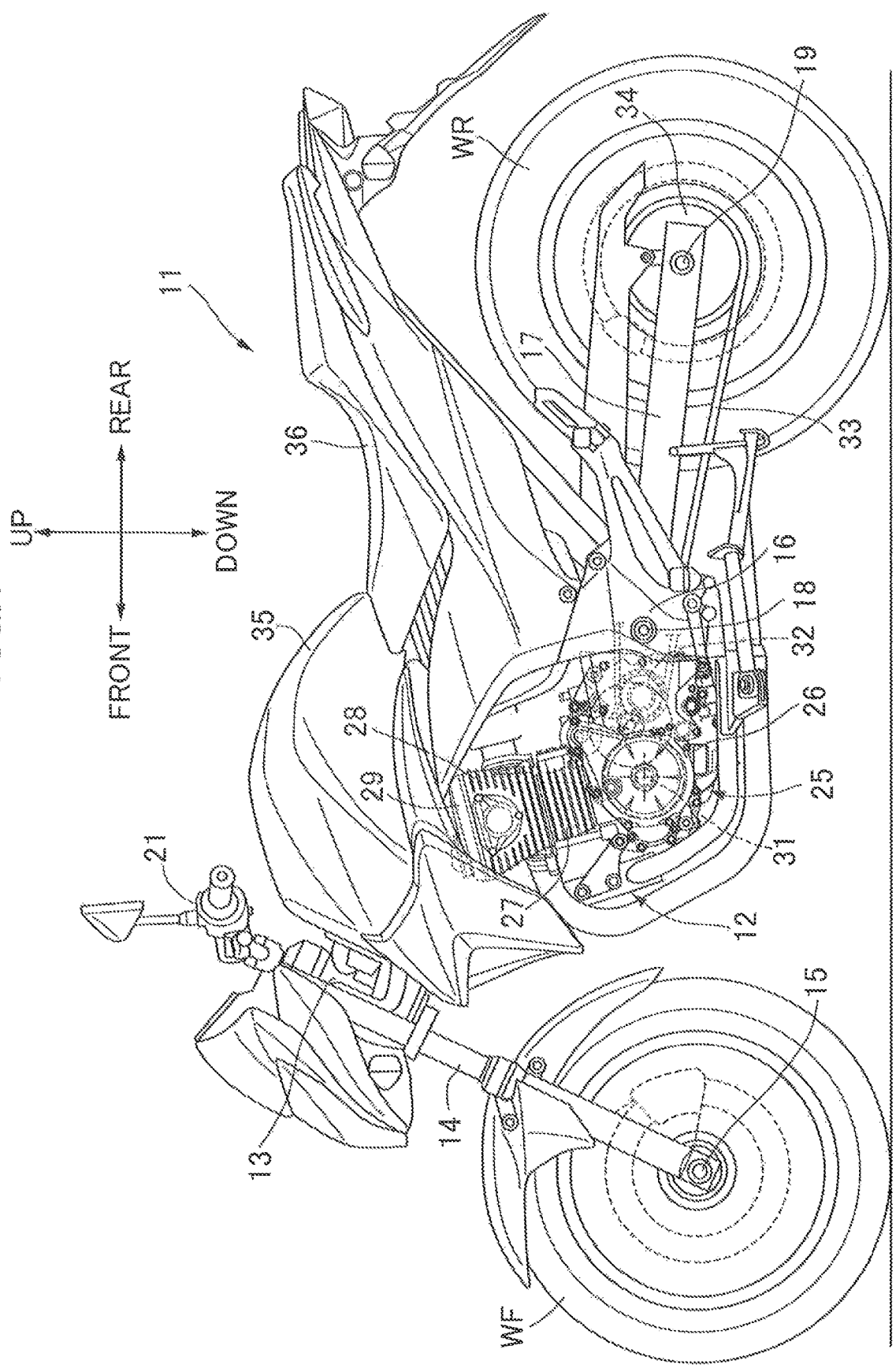
FIG. 1 is a side view schematically depicting an entire configuration of a two-wheeled motor vehicle.

FIG. 1 schematically depicts an entire configuration of a two-wheeled motor vehicle according to an embodiment of the present invention. A two-wheeled motor vehicle 11 includes a vehicle body frame 12. A front fork 14 is steerably supported by a head pipe 13 at a front end of the vehicle body frame 12. A front wheel WF is supported by the front fork 14 rotatably about an axle 15. A handlebar 21 disposed above the head pipe 13 is coupled with the front fork 14. A swing arm 17 is swingably supported about a pivotal shaft 18 extending horizontally in a vehicle width direction on a pivot frame 16 at a rear end of the vehicle body frame 12. A rear wheel WR is supported rotatably about an axle 19 at a rear end of the swing arm 17.

An engine 25 is mounted on the vehicle body frame 12 at a position between the front wheel WF and the rear wheel WR. The engine 25 includes a crankcase 26, a cylinder block 27, a cylinder head 28, and a head cover 29. The cylinder block 27 is coupled with the crankcase 26. The cylinder head 28 is coupled with the cylinder block 27. The head cover 29 is coupled with the cylinder head 28. The crankcase 26 houses a crankshaft 31. The crankshaft 31 rotates about an axis extending in parallel with the axle 19 of the rear wheel WR. The crankshaft 31 rotates in accordance with axial motion of a piston (not depicted) that is slidably fitted in a cylinder bore of the cylinder block 27. The rotary motion of the crankshaft 31 is transmitted to a drive sprocket 32 by way of a power transmission device to be described later. Rotary motion of the drive sprocket 32 is transmitted via a drive chain 33 to a driven sprocket 34 fixed to the rear wheel WR.

A fuel tank 35 is mounted on the vehicle body frame 12 at a position above the engine 25. An occupant seat 36 is mounted on the vehicle body frame 12 at a position posterior to the fuel tank 35. Fuel is supplied from the fuel tank 35 to a fuel injection device of the engine 25. The occupant straddles the occupant seat 36 to operate the two-wheeled motor vehicle 11.

Figure 2:
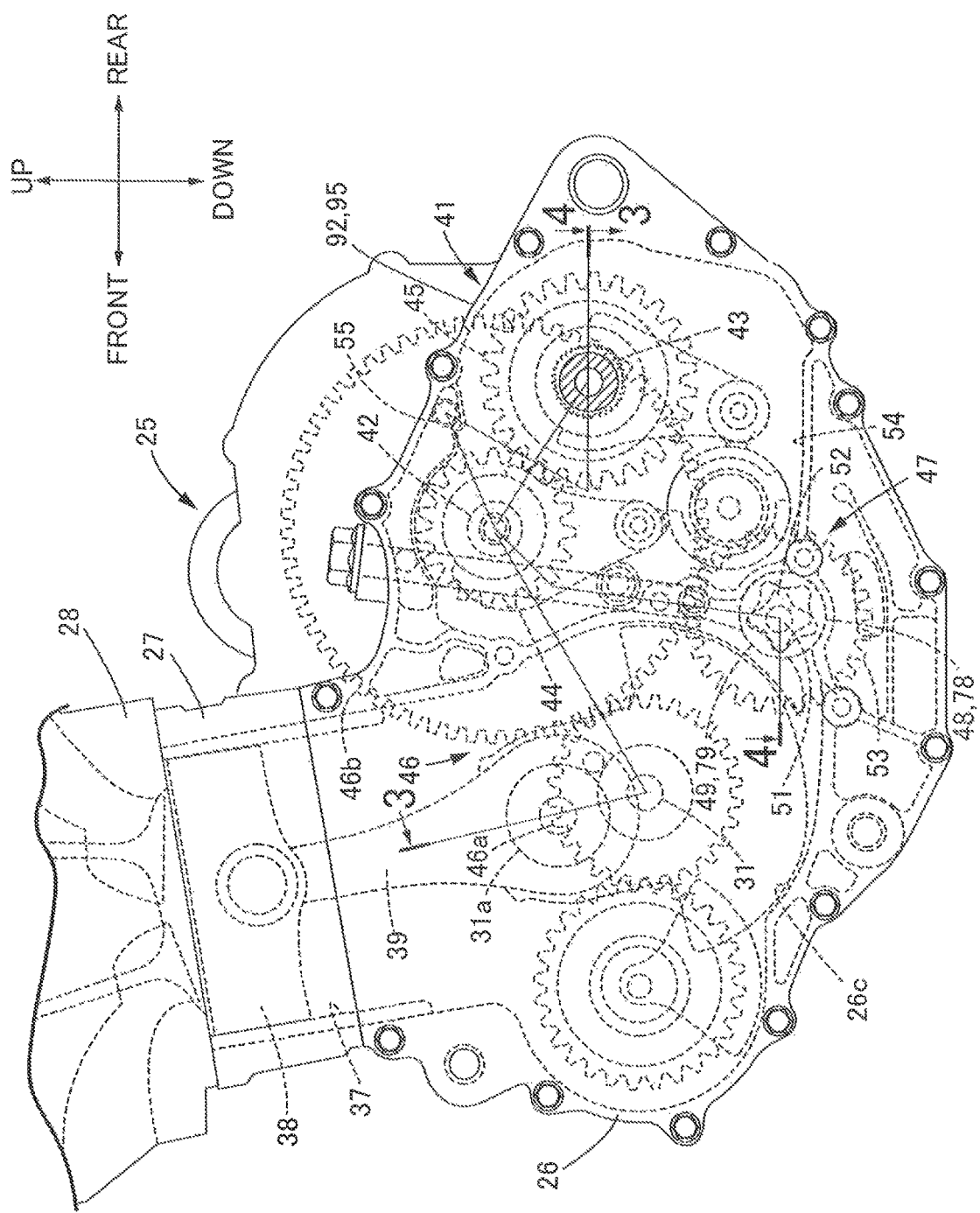
FIG. 2 is an enlarged side view schematically depicting a configuration of an engine.

Reference is made to FIG. 2. A piston 38 is slidably fitted into a cylinder bore 37 of the cylinder block 27. A connecting rod 39 has one end connected with the piston 38 rotatably about an axis extending in parallel with the axis of the crankshaft 31. The connecting rod 39 has an opposite end connected with a crank 31a of the crankshaft 31 inside the crankcase 26. The connecting rod 39 converts the axial motion of the piston 38 into the rotary motion of the crankshaft 31.

A multistage transmission 41 is built into the engine 25. The multistage transmission 41 includes a main shaft (first shaft) 42 and a counter shaft (second shaft) 43. The main shaft 42 and the counter shaft 43 each have an axis extending in parallel with the rotational axis of the crankshaft 31. A first gear group 44 is provided on the main shaft 42. A second gear group 45 is provided on the counter shaft 43. A gear of the second gear group 45 selectively meshes with a gear of the first gear group 44. The first gear group 44 and the second gear group 45 will be described in detail later.

The main shaft 42 is connected with the crankshaft 31 through a primary speed-reduction mechanism 46. The primary speed-reduction mechanism 46 includes a drive gear 46a and a driven gear 46b. The drive gear 46a is fixed to the crankshaft 31. The driven gear 46b is supported relatively rotatably on the counter shaft 43. The driven gear 46b meshes with the drive gear 46a. The drive sprocket 32 is coupled with the counter shaft 43.

A lubrication system 47 is built into the engine 25. The lubrication system 47 includes a feed pump 48. The feed pump 48 is configured as, for example, a trochoid gear type.

In the feed pump 48, a rotor 52 rotates about an axis of a drive shaft 51 within a pump cover 49. Rotation of the rotor 52 displaces oil. The drive shaft 51 has an axis disposed to extend in parallel with the rotational axis of the crankshaft 31. A driven gear 53 that meshes with the driven gear 46b of the primary speed-reduction mechanism 46 is coupled with the drive shaft 51. A rotational force of the driven gear 46b rotates the drive shaft 51. The feed pump 48 pumps up oil from an oil pan 54 and supplies the oil to a sliding portion of the engine 25. Oil flows, for example, from the crankcase 26 to the cylinder head 28 by way of the cylinder block 27 and is supplied from the cylinder head 28 to an open/close valve and a cam. As will be described later, a scavenge pump 78 of a trochoid gear type as with the feed pump 48 is coupled with the drive shaft 51. The scavenge pump 78 discharges oil resident in the crankcase 26 out of the crankcase 26. The oil lubricates the multistage transmission 41 before being collected in the oil pan 54.

An oil pipe 55 is disposed above the first gear group 44 and the second gear group 45. As will be described later, oil is dripped and supplied from the oil pipe 55 to a meshing portion between the first gear group 44 and the second gear group 45. As will be described later, the oil pipe 55 communicates with the scavenge pump 78 by way of an oil passage in the crankcase 26.

Figure 3:
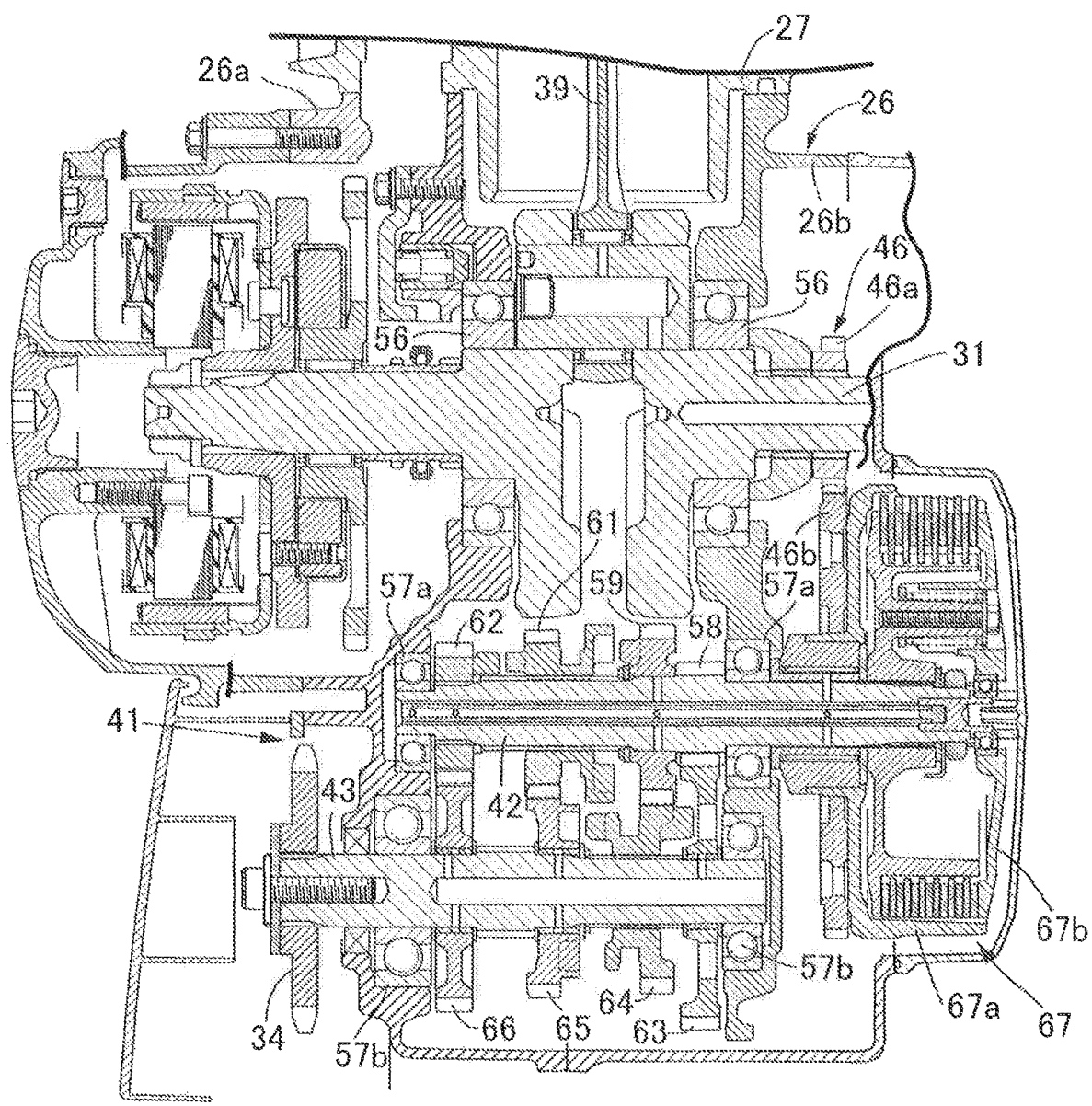
FIG. 3 is a sectional view of the engine schematically depicting a configuration of a multistage transmission.

Reference is made to FIG. 3. The crankcase 26 includes a first case half body 26a and a second case half body 26b. The crankshaft 31 is rotatably supported in the first case half body 26a and the second case half body 26b via bearings 56 respectively fitted in the first case half body 26a and the second case half body 26b. The main shaft 42 and the counter shaft 43 are rotatably supported in the first case half body 26a and the second case half body 26b via bearings 57a and 57b fitted, respectively, in the first case half body 26a and the second case half body 26b.

The first gear group 44 includes four drive gears. The drive gears include, in sequence, a first speed drive gear 58, a fourth speed drive gear 59, a third speed drive gear 61, and a second speed drive gear 62. Similarly, the second gear group 45 includes four driven gears. The driven gears include, in sequence, a first speed driven gear 63, a fourth speed driven gear 64, a third speed driven gear 65, and a second speed driven gear 66. The first speed driven gear 63 continuously meshes with the first speed drive gear 58. The fourth speed driven gear 64 selectively meshes with the fourth speed drive gear 59 in accordance with motion of a shifter. Similarly, the third speed driven gear 65 selectively meshes with the third speed drive gear 61 in accordance with motion of a shifter. The second speed driven gear 66 continuously meshes with the second speed drive gear 62. In the multistage transmission 41, a coupled state is selectively changed over to a neutral state, a first speed coupled state, a second speed coupled state, a third speed coupled state, or a fourth speed coupled state.

A friction clutch 67 is incorporated in the engine 25. The friction clutch 67 includes a clutch outer 67a and a clutch hub 67b. The driven gear 46b of the primary speed-reduction mechanism 46 is connected with the clutch outer 67a. In the friction clutch 67, connection and disconnection between the clutch outer 67a and the clutch hub 67b are switched in accordance with an operation of a clutch lever 23.

Figure 4:
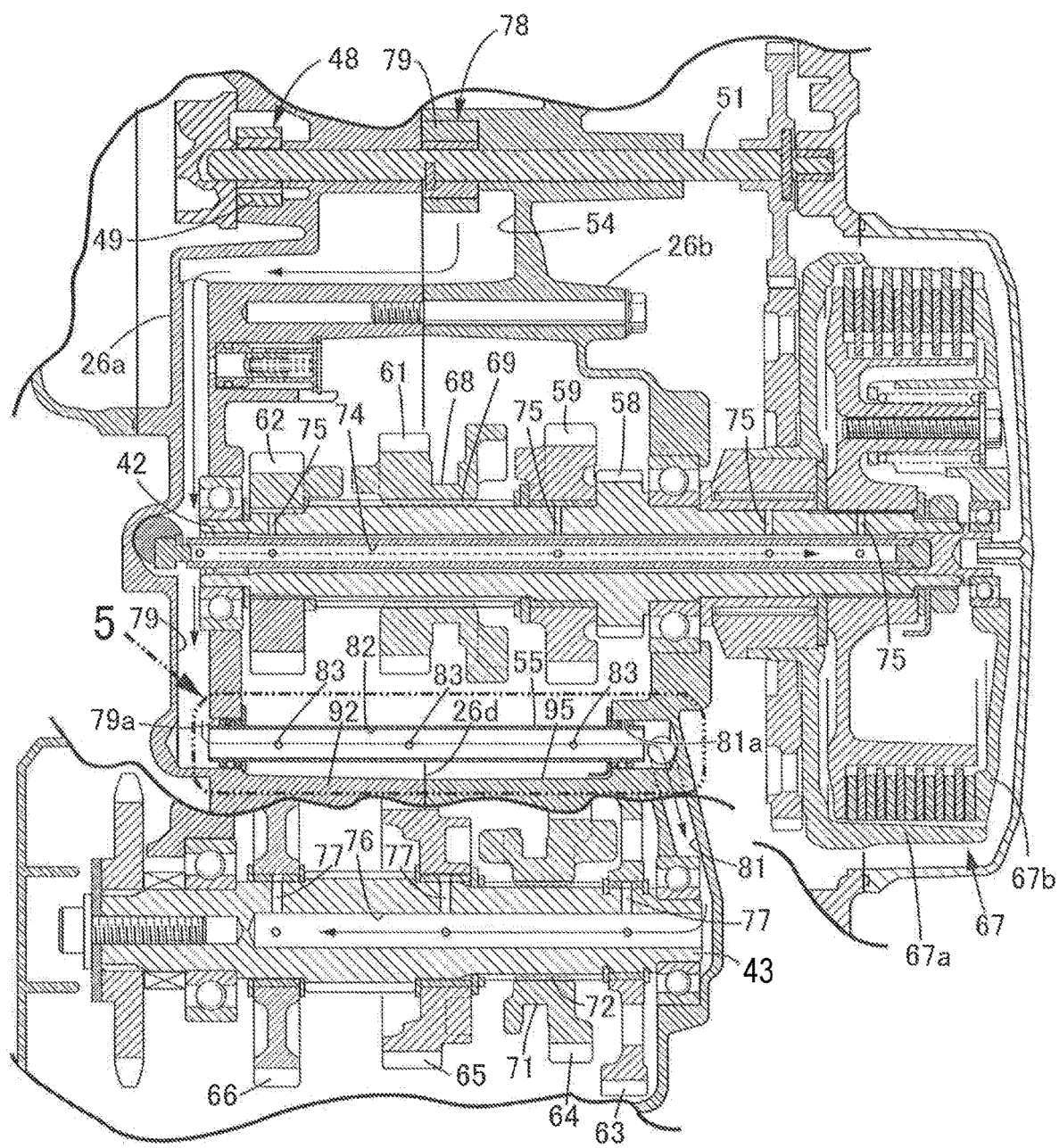
FIG. 4 is a sectional view of the engine schematically depicting oil passages.

As depicted in FIG. 4, the first speed drive gear 58 is integrally formed with the main shaft 42. The fourth speed drive gear 59 is supported on the main shaft 42 so as to be relatively rotatable and axially nondisplaceable with respect to the main shaft 42. The third speed drive gear 61 is integrated with a first shifter 68. The first shifter 68 is fitted over splines 69 formed in an outer periphery of the main shaft 42 and supported on the splines 69 so as to be relatively unrotatable and axially displaceable. The second speed drive gear 62 is supported on the main shaft 42 so as to be relatively rotatable and axially nondisplaceable with respect to the main shaft 42.

The first speed driven gear 63 is supported on the counter shaft 43 so as to be relatively rotatable and axially nondisplaceable with respect to the counter shaft 43. The fourth speed driven gear 64 is integrated with a second shifter 71. The second shifter 71 is fitted over splines 72 formed in an outer periphery of the counter shaft 43 and supported on the splines 72 so as to be relatively unrotatable and axially displaceable. The third speed driven gear 65 is supported on the counter shaft 43 so as to be relatively rotatable and axially nondisplaceable with respect to the counter shaft 43. The second speed driven gear 66 is fitted over splines formed in the outer periphery of the counter shaft 43 and supported on the splines so as to be relatively unrotatable and axially nondisplaceable.

When the first shifter 68 is located at an axial reference position on the main shaft 42 and the second shifter 71 is located at an axial reference position on the counter shaft 43, the fourth speed drive gear 59 on the main shaft 42 meshes with the fourth speed driven gear 64 on the counter shaft 43 and the third speed drive gear 61 on the main shaft 42 meshes with the third speed driven gear 65 on the counter shaft 43. The fourth speed drive gear 59 and the second speed drive gear 62 rotate relatively with respect to the main shaft 42. The first speed driven gear 63 and the third speed driven gear 65 rotate relatively with respect to the counter shaft 43. A neutral state is established in the multistage transmission 41.

When the second shifter 71 meshes with the first speed driven gear 63 on the counter shaft 43 from the neutral state, the first speed driven gear 63 is coupled with the counter shaft 43. At this time, the fourth speed driven gear 64 disengages from the fourth speed drive gear 59 on the main shaft 42. The meshing engagement between the fourth speed drive gear 59 and the fourth speed driven gear 64 is released. A rotational force of the main shaft 42 to be transmitted to the first speed driven gear 63 drives the counter shaft 43. A first speed is thereby established in the multistage transmission 41.

When the first shifter 68 meshes with the second speed drive gear 62 on the main shaft 42 from the neutral state, the second speed drive gear 62 is coupled with the main shaft 42. At this time, the third speed drive gear 61 disengages from the third speed driven gear 65 on the counter shaft 43. The meshing engagement between the third speed drive gear 61 and the third speed driven gear 65 is released. The rotational force of the main shaft 42 is transmitted to the second speed drive gear 62. A second speed is thereby established in the multistage transmission 41.

When the second shifter 71 meshes with the third speed driven gear 65 on the counter shaft 43 from the neutral state, the third speed driven gear 65 is coupled with the counter shaft 43. At this time, the fourth speed driven gear 64 disengages from the fourth speed drive gear 59 on the main shaft 42. The meshing engagement between the fourth speed drive gear 59 and the fourth speed driven gear 64 is released. The rotational force of the main shaft 42 to be transmitted to the third speed driven gear 65 drives the counter shaft 43. A third speed is thereby established in the multistage transmission 41.

When the first shifter 68 meshes with the fourth speed drive gear 59 on the main shaft 42 from the neutral state, the fourth speed drive gear 59 is coupled with the main shaft 42. At this time, the third speed drive gear 61 disengages from the third speed driven gear 65 on the counter shaft 43. The meshing engagement between the third speed drive gear 61 and the third speed driven gear 65 is released. The rotational force of the main shaft 42 is transmitted to the fourth speed drive gear 59. A fourth speed is thereby established in the multistage transmission 41.

A hollow space 74 is defined in the main shaft 42. The hollow space 74 extends in an axial direction of the main shaft 42 along an axis of the main shaft 42. The hollow space 74 is formed into, for example, a slender cylindrical shape coaxial with the main shaft 42. The hollow space 74 has one end opening in an end face of the main shaft 42. The hollow space 74 has an opposite end closed.

The main shaft 42 has small holes 75 defined therein. The small holes 75 communicate with the hollow space 74. The small holes 75 each extend in a radial direction orthogonal to the axis of the main shaft 42 and open in an outer peripheral surface of the main shaft 42. The small holes 75 may have openings that face, for example, inner peripheral surfaces of the clutch outer 67*a*, the fourth speed drive gear 59, and the second speed drive gear 62 that rotate relatively with respect to the main shaft 42.

A hollow space 76 is defined in the counter shaft 43. The hollow space 76 extends in an axial direction of the counter shaft 43 along an axis of the counter shaft 43. The hollow space 76 is formed into, for example, a slender cylindrical shape coaxial with the counter shaft 43. The hollow space 76 has one end opening in an end face of the counter shaft 43. The hollow space 76 has an opposite end closed.

The counter shaft 43 has small holes 77 defined therein. The small holes 77 communicate with the hollow space 76. The small holes 77 each extend in a radial direction orthogonal to the axis of the counter shaft 43 and open in an outer peripheral surface of the counter shaft 43. The small holes 77 may have openings that face, for example, inner peripheral surfaces of the first speed driven gear 63 and the third speed driven gear 65 that rotate relatively with respect to the counter shaft 43, and the second speed driven gear 66 splined to the counter shaft 43.

The lubrication system 47 includes a first oil passage 79 and a second oil passage 81. The first oil passage 79 is formed in the first case half body 26*a* of the crankcase 26 and communicates with the scavenge pump 78. The first oil passage 79 has an opening 79*a* disposed in an inner surface of the first case half body 26*a*, so as receive and support one end of the oil pipe 55. The second oil passage 81 is formed in the second case half body 26*b* of the crankcase 26 and communicates with the hollow space 76 in the counter shaft 43. The second oil passage 81 has an opening 81*a* disposed in an inner surface of the second case half body 26*b*, so as to receive and support an opposite end of the oil pipe 55. The hollow space 74 in the main shaft 42 is connected with the first oil passage 79. The first oil passage 79 is bifurcated in midway into an oil passage of the main shaft 42 and an oil passage communicating with the oil pipe 55.

The oil pipe 55 includes an oil passage 82 defined therein. The oil passage 82 extends from the first oil passage 79 to the second oil passage 81. The oil passage 82 connects the second oil passage 81 with the first oil passage 79. The oil pipe 55 has small holes 83 defined therein at positions corresponding with the meshing portions between the first gear group 44 and the second gear group 45. The small holes 83 are continuous from the oil passage 82 so as to be open in an outer peripheral surface of the oil pipe 55. The openings in the small holes 83 may be oriented toward respective meshing portions.

When the scavenge pump 78 operates, oil flows from the oil pan 54 into the first oil passage 79. The oil is supplied from the first oil passage 79 to the main shaft 42 and the oil pipe 55. Oil that has flowed into the hollow space 74 in the main shaft 42 flows from the small holes 75 to inner peripheral surfaces of the clutch outer 67a, the fourth speed drive gear 59, and the second speed drive gear 62. This results in the sliding portion between the clutch outer 67a and the main shaft 42, the sliding portion between the fourth speed drive gear 59 and the main shaft 42, and the sliding portion between the second speed drive gear 62 and the main shaft 42 being lubricated with oil. Friction resistance is reduced in the sliding portions.

Oil that has flowed into the oil pipe 55 flows from the small holes 83. The oil that has flowed out of the small holes 83 is blown against the meshing portion between the fourth speed drive gear 59 and the fourth speed driven gear 64, the meshing portion between the third speed drive gear 61 and the third speed driven gear 65, and the meshing portion between the second speed drive gear 62 and the second speed driven gear 66. As a result, the respective meshing portions are lubricated with oil. Friction resistance is reduced in the meshing portions.

Oil flows from the oil pipe 55 into the second oil passage 81. The oil that has flowed in the second oil passage 81 is supplied from the second oil passage 81 to the counter shaft 43. Oil that has flowed into the hollow space 76 in the counter shaft 43 flows from the small holes 77 to inner peripheral surfaces of the first speed driven gear 63, the third speed driven gear 65, and the second speed driven gear 66. This results in the sliding portion between the first speed driven gear 63 and the counter shaft 43, the sliding portion between the third speed driven gear 65 and the counter shaft 43, and the sliding portion between the second speed driven gear 66 and the counter shaft 43 being lubricated with oil. Friction resistance is reduced in the sliding portions.

Figure 5:
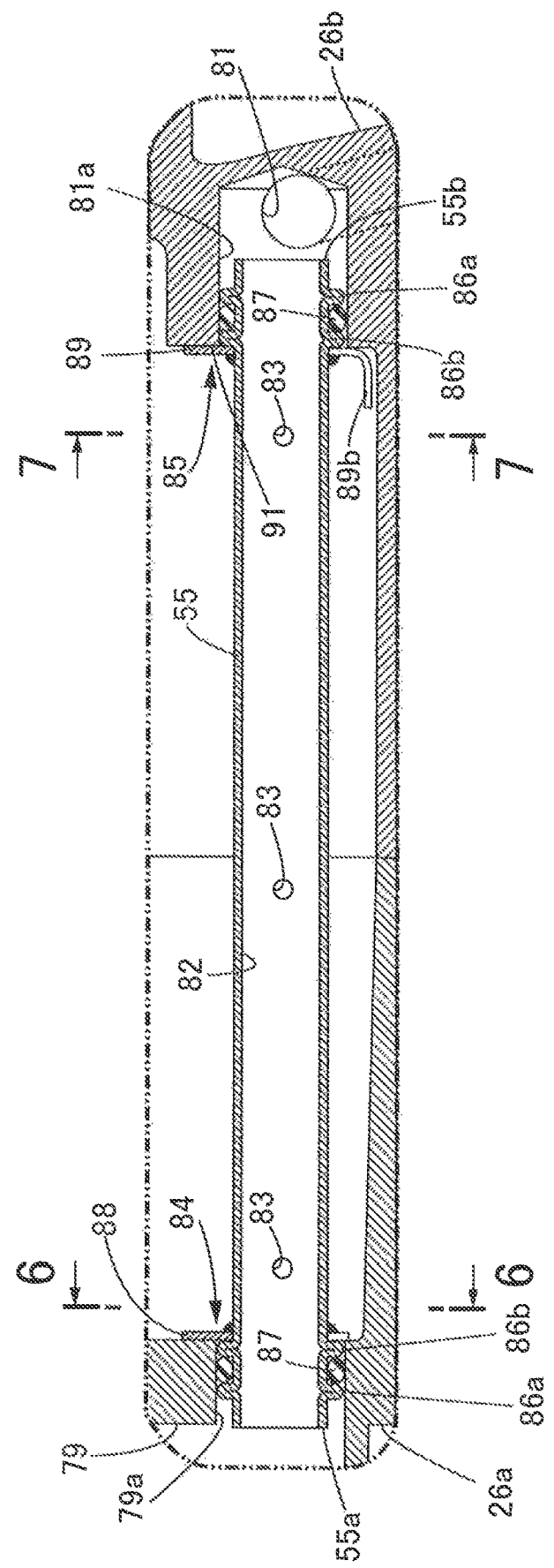
FIG. 5 is an enlarged partial sectional view of the engine schematically depicting a configuration of an oil pipe.

Reference is made to FIG. 5. The oil pipe 55 includes a first restricting portion 84 and a second restricting portion 85. The first restricting portion 84 abuts against an inner surface of the first case half body 26a to thereby restrict an axial position on the outside in one direction. The second restricting portion 85 abuts against an inner surface of the second case half body 26b to thereby restrict an axial position on the outside in an other direction and rotation. The oil pipe 55 has a first end 55a and a second end 55b. The first end 55a is supported within the first oil passage 79. The second end 55b is disposed on the side opposite to the first end 55a and supported within the second oil passage 81. At each of the first end 55a and the second end 55b, a sealing member 87 is disposed between a pair of small flanges 86a and 86b. The sealing member 87 establishes a fluid-tight condition between an inner wall surface of each of the openings 79a and 81a and the outer peripheral surface of the oil pipe 55. The small flanges 86a and 86b are formed integrally with a stock of the oil pipe 55 by bending and prevent the sealing members 87 from being removed.

The first restricting portion 84 is formed by a flat plate 88 that expands along an imaginary plane orthogonal to the axis of the oil pipe 55. The flat plate 88 may be fixed at a position inside the small flange 86b that is second from the outside at the first end 55a. The flat plate 88 may be fixed in position by, for example, welding.

The second restricting portion 85 is formed by an arm body 89 extending outwardly from the outer periphery of the oil pipe 55. The arm body 89 may be manufactured by bending, for example, a flat metal plate. The arm body 89 may be fixed at a position inside the small flange 86b that is second from the outside at the second end 55b. The arm body 89 may be fixed in position by, for example, welding. The arm body 89 abuts against an axial support surface 91 of the second case half body 26b to thereby restrict the axial position.

Figure 6:
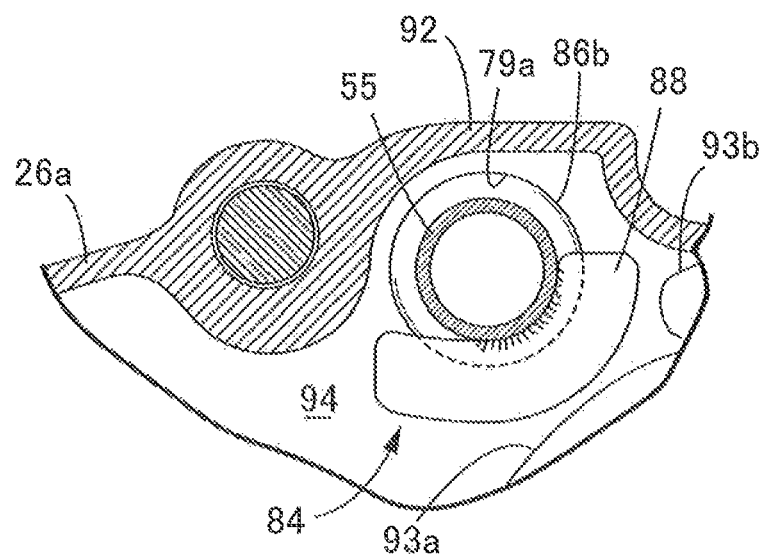
FIG. 6 is a sectional view taken along line 6-6 in FIG. 5.

Reference is made to FIG. 6. The opening 79a in the first oil passage 79 is formed in a planar region 94 surrounded by an outer wall 92 of the first case half body 26a and protrusions 93a and 93b. The flat plate 88 of the first restricting portion 84 has a profile partitioned to follow along the shape of the planar region 94. The planar region 94 planarly bears the flat plate 88.

Figure 7:
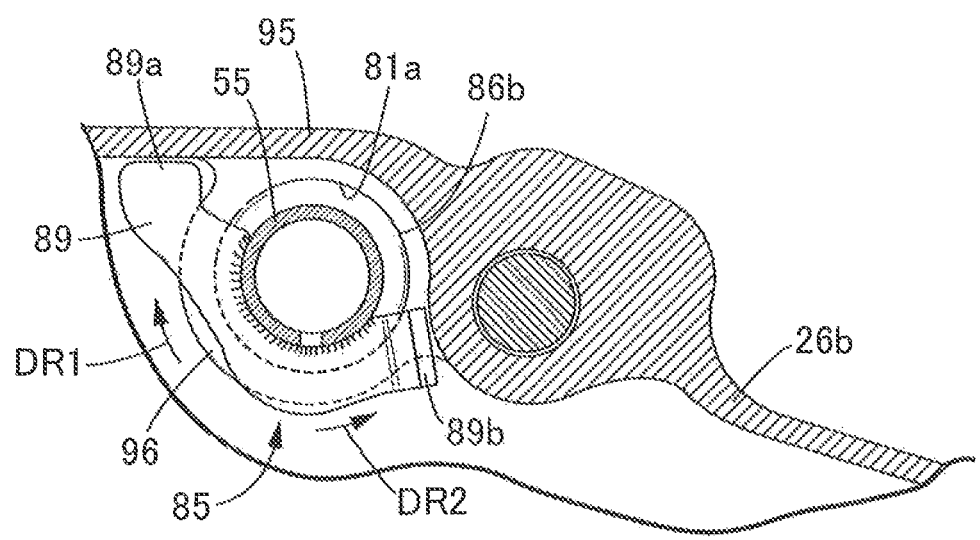
FIG. 7 is a sectional view taken along line 7-7 in FIG. 5.

Reference is made to FIG. 7. The opening 81a in the second oil passage 81 is formed in a planar region 96 surrounded partially by an outer wall 95 of the second case half body 26b. The planar region 96 is defined on an upper surface of a boss shape that surrounds the opening 81a. An inner end face of the outer wall 92 fluid-tightly abuts against an inner end face of the outer wall 95 at a faying surface 26d to thereby form the crankcase 26. The arm body 89 of the second restricting portion 85 abuts against the outer wall 95 at two positions. The arm body 89 has a first end 89a and a second end 89b. The first end 89a abuts against a flat surface of the outer wall 95 to thereby lock the arm body 89 so as to execute a rotation lock for the oil pipe 55 when the arm body 89 rotates about an axis of the oil pipe 55 in a first direction DR1. The second end 89b abuts against a cylindrical portion formed of a female screw boss of the outer wall 95 to thereby lock the arm body 89 so as to execute a rotation lock for the oil pipe 55 when the arm body 89 rotates in a second direction DR2 opposite to the first direction DR1. The oil pipe 55 is restricted from rotation about the axis thereof in either direction. The flat plate 88 of the first restricting portion 84 has a shape different from the shape of the arm body 89 of the second restricting portion 85.

When the first case half body 26a and the second case half body 26b of the crankcase 26 are coupled with each other at the faying surface 26d, the first restricting portion 84 and the second restricting portion 85 of the oil pipe 55 abut against an inner surface of the first case half body 26a and an inner surface of the second case half body 26b, respectively. The foregoing results in the small holes 83 in the oil pipe 55 being accurately positioned with respect to the meshing portions between the first gear group 44 and the second gear group 45. The oil can thus be dripped precisely at the gear meshing portions. Because bolt holes and pin housing holes are omitted in positioning the oil pipe 55 at this time, an increase in size of the crankcase 26 can be prevented. Moreover, assemblability of the crankcase 26 is enhanced.

In the multistage transmission 41 according to the embodiment, the arm body 89 abuts against the outer wall 95 of the second case half body 26b at two places. Rotational restriction can thus be performed with a simple configuration without the need to provide a boss, for example, on the crankcase 26 side.

The arm body 89 abuts against the axial support surface 91 of the second case half body 26b to thereby restrict the axial position. Axial positioning can be performed reliably by the first restricting portion 84 and the arm body 89 of the second restricting portion 85, so that lubrication of the meshing portions can be favorably achieved.

The flat plate 88 of the first restricting portion 84 has a shape different from the shape of the arm body 89 of the second restricting portion 85. An assembly operator thus can readily differentiate between the first restricting portion 84 and the second restricting portion 85. When, for example, the oil pipe 55 is wrongly assembled in the crankcase 26, the shapes reject abutment against the inner surfaces of the crankcase 26, so that wrong assembly can be prevented.

The first oil passage 79 is formed in the first case half body 26a. The first oil passage 79 communicates with the scavenge pump 78 and has the opening 79a disposed in the inner surface of the first case half body 26a so as to receive and support one end of the oil pipe 55. The second oil passage 81 is formed in the second case half body 26b. The second oil passage 81 communicates with the hollow space 76 in the counter shaft 43 and has the opening 81a disposed in the inner surface of the second case half body 26b so as to receive and support an opposite end of the oil pipe 55. The oil pipe 55 has protrusions for restriction only on the outer periphery thereof, but does not have them inside the oil pipe 55, thereby achieving favorable oil flow.

As described above, the multistage transmission 41 in the embodiment includes the first case half body 26a and the second case half body 26b, the main shaft 42, the counter shaft 43, the oil pipe 55, the first restricting portion 84, and the second restricting portion 85. The first case half body 26a and the second case half body 26b are coupled together at the faying surface to thereby form the crankcase 26 at least partially. The main shaft 42 has one end supported by the first case half body 26a and an opposite end supported by the second case half body 26b and supports the first gear group 44. The counter shaft 43 has one end supported by the first case half body 26a and an opposite end supported by the second case half body 26b and supports the second gear group 45 that meshes with the first gear group 44. The oil pipe 55 is disposed above the first gear group 44 and the second gear group 45 and has one end supported in an oil passage hole (opening 79a) of the first case half body 26a and an opposite end supported in an oil passage hole (opening 81a) of the second case half body 26b. The oil pipe 55 has the small holes 83, each being disposed to be associated with each of the gears belonging to the first gear group 44 and the second gear group 45. The oil pipe 55 further includes the first restricting portion 84 and the second restricting portion 85 formed thereon. The first restricting portion 84 contacts the inner surface of the first case half body 26a in the axial direction. The second restricting portion 85 contacts the inner surface of the second case half body 26b in the axial direction and the direction about the axis. When the crankcase 26 is to be assembled, the first case half body 26a and the second case half body 26b are coupled together at the faying surface. Upon coupling, the main shaft 42, the counter shaft 43, and the oil pipe 55 are supported at both ends by the inner surface of the first case half body 26a and the inner surface of the second case half body 26b. The oil pipe 55 has the one end inserted in the oil passage hole in the first case half body 26a and the opposite end inserted in the oil passage hole in the second case half body 26b. The second restricting portion 85 restricts the axial position and the axial posture of the oil pipe 55 with respect to the second case half body 26b. The first restricting portion 84 restricts the axial position of the oil pipe 55 with respect to the first case half body 26a. The foregoing arrangements enable the small holes 83 in the oil pipe 55 to be accurately positioned with respect to the respective gears when the crankcase 26 is assembled. Oil is precisely dripped onto the gear meshing portions.

What is claimed is:

1. A transmission comprising:
   a case formed by coupling at least a first unit and a second unit together;
   a first gear group disposed on a first shaft that is supported straddlingly on the first unit and the second unit;
   a second gear group disposed on a second shaft and meshing with the first gear group; and
   an oil pipe disposed above the first gear group and the second gear group, the oil pipe having small holes formed therein, the oil pipe having a first end and a second end opposite the first end, each of the first and second ends having a pair of small flanges thereon which protrude radially outwardly at positions axially distanced from each other, the small flanges formed by bending,
   wherein:
   a seal member is disposed between the small flanges at each of the first and second ends of the oil pipe, respectively,
   the oil pipe is formed integrally with a first restricting portion and a second restricting portion, the first restricting portion abutting against an inner surface of the first unit inside the case to thereby restrict an axial position of the oil pipe on an outside in a first direction, and the second restricting portion abutting against an inner surface of the second unit to thereby restrict an axial position of the oil pipe on an outside in a second direction and to restrict rotation thereof, each of the first and second restricting portions being fixed to the oil pipe at a position inside an axially inner one of the pair of small flanges.

2. The transmission according to claim 1, wherein
   the second restricting portion includes an arm portion extending outwardly from an outer periphery of the oil pipe, and
   the arm portion abuts against an outer peripheral wall of the second unit at two places.

3. The transmission according to claim 2, wherein the arm portion abuts against an axial support surface of the second unit to thereby restrict the axial position of the oil pipe.

4. The transmission according to claim 1, wherein the first restricting portion has a shape different from a shape of the second restricting portion.

5. The transmission according to claim 1, wherein,
   the first unit includes a first oil passage formed therein, the first oil passage communicating with a scavenge pump and having an opening disposed in the inner surface of the first unit so as to receive and support one end of the oil pipe, and
   the second unit includes a second oil passage formed therein, the second oil passage communicating with a hollow space in the second shaft and having an opening disposed in the inner surface of the second unit so as to receive and support an opposite end of the oil pipe.

6. The transmission according to claim 4, wherein,
   the first unit includes a first oil passage formed therein, the first oil passage communicating with a scavenge pump and having an opening disposed in the inner surface of the first unit so as to receive and support one end of the oil pipe, and
   the second unit includes a second oil passage formed therein, the second oil passage communicating with a hollow space in the second shaft and having an opening disposed in the inner surface of the second unit so as to receive and support an opposite end of the oil pipe.

7. The transmission according to claim 2, wherein the first restricting portion has a shape different from a shape of the second restricting portion.

8. The transmission according to claim 3, wherein the first restricting portion has a shape different from a shape of the second restricting portion.

9. The transmission according to claim 2, wherein,
the first unit includes a first oil passage formed therein, the first oil passage communicating with a scavenge pump and having an opening disposed in the inner surface of the first unit so as to receive and support one end of the oil pipe, and the second unit includes a second oil passage formed therein, the second oil passage communicating with a hollow space in the second shaft and having an opening disposed in the inner surface of the second unit so as to receive and support an opposite end of the oil pipe.

10. The transmission according to claim 3, wherein,
the first unit includes a first oil passage formed therein, the first oil passage communicating with a scavenge pump and having an opening disposed in the inner surface of the first unit so as to receive and support one end of the oil pipe, and the second unit includes a second oil passage formed therein, the second oil passage communicating with a hollow space in the second shaft and having an opening disposed in the inner surface of the second unit so as to receive and support an opposite end of the oil pipe.

\* \* \* \* \*